United States Patent [19]

Saegusa

[11] Patent Number: 5,109,393
[45] Date of Patent: Apr. 28, 1992

[54] MOBILE COMMUNICATIONS SYSTEM INSENSITIVE TO FALSE FRAME SYNC

[75] Inventor: Noboru Saegusa, Tokyo, Japan

[73] Assignee: NEC Corporation, Japan

[21] Appl. No.: 552,777

[22] Filed: Jul. 13, 1990

[30] Foreign Application Priority Data

Jul. 13, 1989 [JP] Japan .................................. 1-181507

[51] Int. Cl.$^5$ ............................................................ H04L 7/00
[52] U.S. Cl. ..................................... 375/108; 375/116; 370/105.1
[58] Field of Search ............... 375/106, 114, 108, 116; 370/100.1, 105.1, 106; 340/825.05, 825.02

[56] References Cited

U.S. PATENT DOCUMENTS

| | | | |
|---|---|---|---|
| 4,506,372 | 3/1985 | Massey et al. ...................... | 375/116 |
| 4,562,574 | 12/1985 | Kambayashi ..................... | 370/105.1 |
| 4,747,116 | 5/1988 | Yatima ................................. | 375/116 |
| 4,779,087 | 10/1988 | Fukuda et al. ........................ | 375/107 |
| 4,937,843 | 6/1990 | Takemoto ............................ | 375/116 |
| 4,974,225 | 11/1990 | Chenier et al. .................... | 370/105.1 |
| 4,984,238 | 1/1991 | Watanabe et al. ................... | 375/114 |

Primary Examiner—Stephen Chin
Attorney, Agent, or Firm—Ostrolenk, Faber, Gerb & Soffen

[57] ABSTRACT

In a mobile communication system, the base station sequentially scans speech channels and a control channel to monitor call status and detect a call request from a mobile station containing a frame sync and an encoded user's identifier. A successive bit sequence of the call request signal is stored into first and second buffers. A first count value is derived to represent a count of bits stored into the first buffer substantially from the instant an earlier one of two successively detected sync codes is detected, and a second count value is derived to represent a count of bits stored into the second buffer substantially from the instant a later one of the sync codes is generated. When the first and second count values respectively reach a prescribed value, the corresponding one of the buffers is triggered and the bit sequence in the triggered buffer is loaded into a decoder in which it is decoded and checked against a stored version of the user's identifier. If there is a match between them, a signal is transmitted to the mobile station indicating that the call request is accepted. In a modified embodiment, a single buffer is provided and a count value is incremented in response to each of two successively detected sync codes if they are spaced apart by a longer interval, or in response to an earlier one of these sync codes if they are spaced apart by a smaller interval. The bit sequence in the single buffer is loaded into the decoder when the single count value reaches a prescribed value.

6 Claims, 4 Drawing Sheets

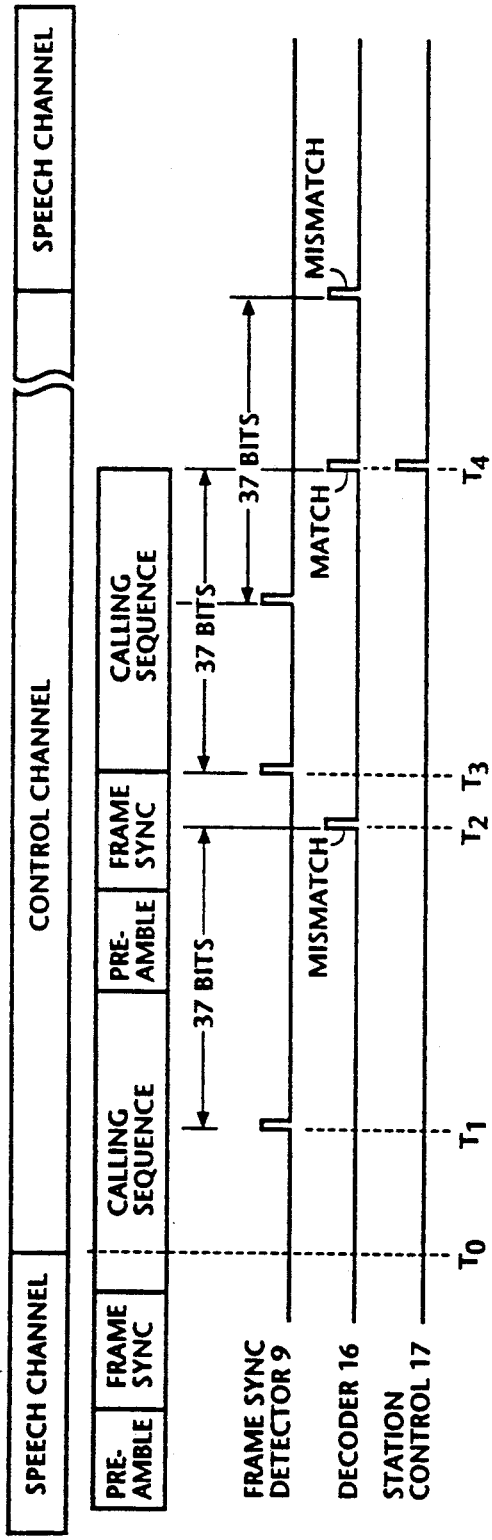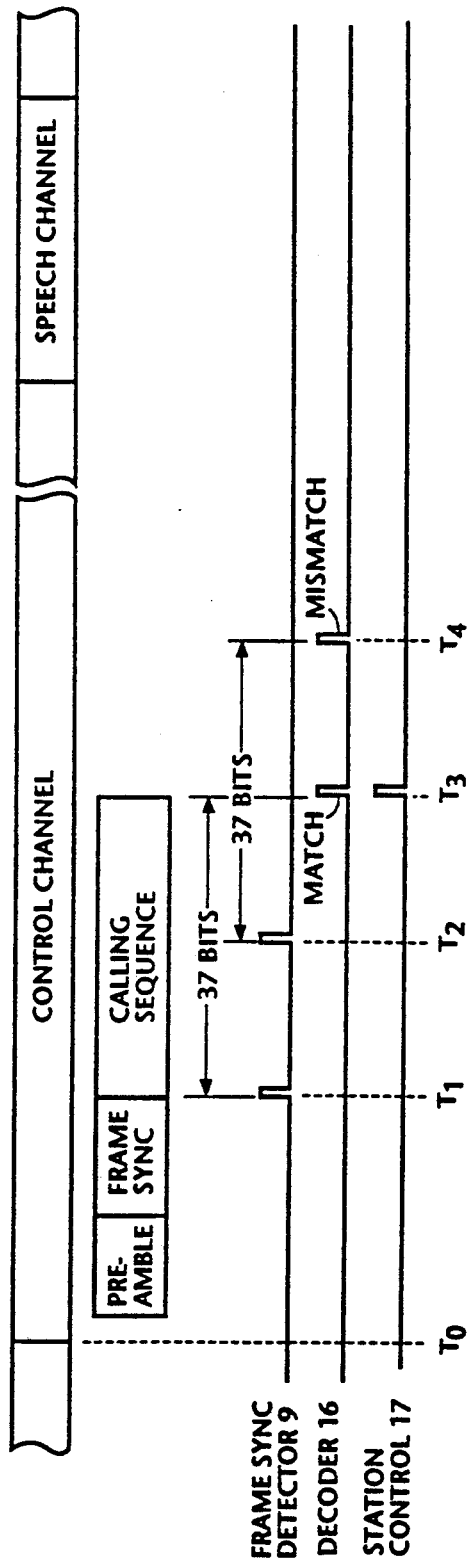

BASE STATION 1

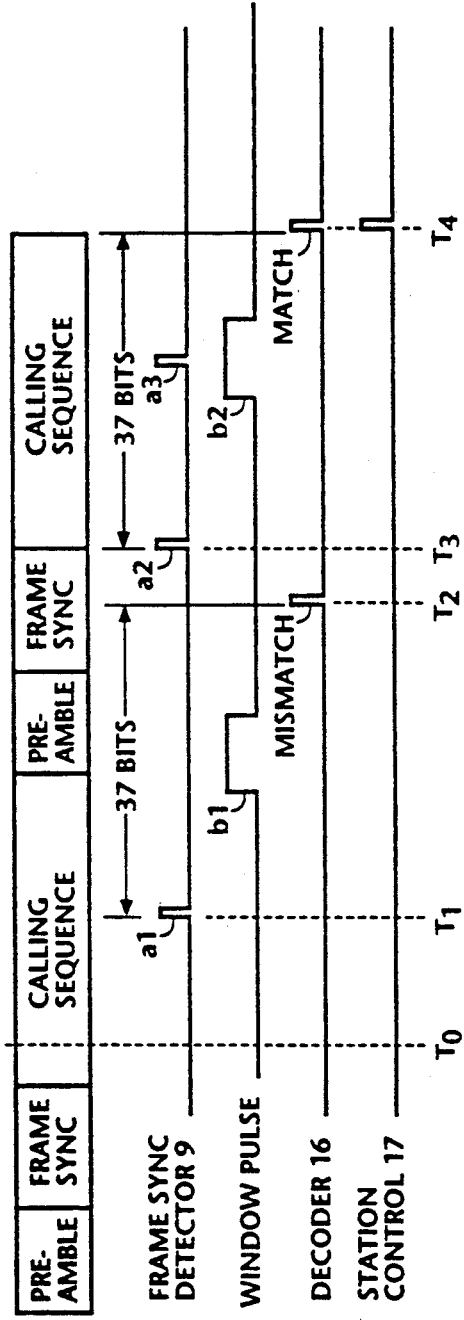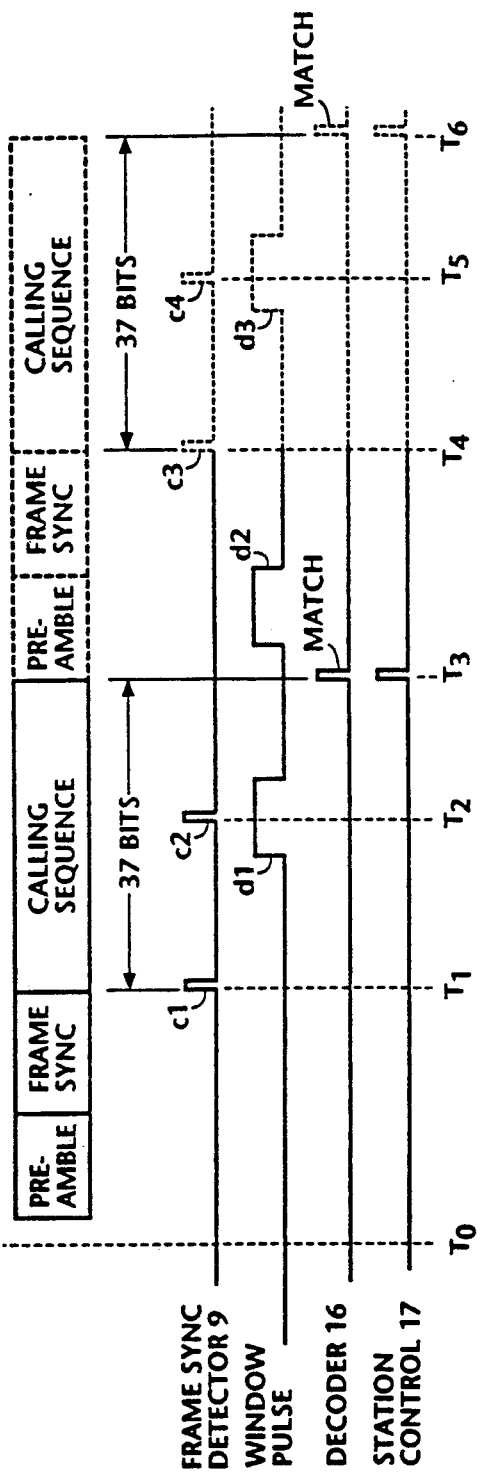
FIG. 4A
FIG. 4B

MOBILE COMMUNICATIONS SYSTEM INSENSITIVE TO FALSE FRAME SYNC

BACKGROUND OF THE INVENTION

The present invention relates to a mobile communications system.

In a prior art mobile communications system, a base station (connecting unit) is connected to a switched telephone network and radio speech channels are established between it and portable telephones. A control channel is used during channel acquisition and release to transmit control signals including a control signal. The base station constantly monitors the status of calls and the request of a call from mobile units by sequentially scanning the speech channels and control channel. The control signal of the system includes a preamble which is a 12-bit sequence of alternating 1's and 0's for clock timing recovery, a frame sync field containing a 16-bit sequence of "1100010011010110", and a 37-bit calling sequence which is a 25-bit user's identification code encoded with 12 error correcting bits. The base station recovers clock timing from the preamble of a control signal received on the control channel and proceeds to detect a frame sync code from the subsequent frame sync field of the control signal. Upon detection of a frame sync, the base station stores the following calling sequence into a buffer by counting the recovered clock pulses. However, the error correction encoding can result in a bit sequence identical to the 16-bit frame sync code. For example, encoding of an identification code "806240" results in a 37-bit code "0000011000100110101100000000001011011" which contains a sequence having the same bit pattern as the 16-bit frame sync code as identified by an underline. To prevent the stored calling sequence from being disrupted by a false sync code, the base station is "locked" into a state in which it is insensitive to the subsequent frame sync until an entire 37-bit calling sequence is stored into the buffer.

One shortcoming of this approach is that, due to the constant scanning operation, the base station may switch from one speech channel to the control channel at the instant a calling sequence is being received. If this calling sequence contains a false sync code, and if clock timing is shortly recovered, such false sync code will be detected and the buffer will be supplied with information other than the intended calling sequence. The result is a decision by a decoder that a mismatch has occurred between the received user's identification code and a stored version of the code. Since the base station remains locked in response to a frame sync until the buffer is completely supplied with a 37-bit sequence, the true sync code of the next control signal can occur in this locked state, and the base station will be locked again following the next false sync code, and a mismatch decision is repeated. This process continues indefinitely.

SUMMARY OF THE INVENTION

It is therefore an object of the present invention to provide a mobile communications system which is insensitive to false sync codes which might be falsely embedded in a control signal.

A mobile communications system of this invention include a base station and one or more mobile stations, the base station being connected to a switched telecommunication network. The base station comprises a transceiver for establishing speech channels with the mobile stations for carrying information signals between the mobile stations and the switched telecommunication network and a control channel for carrying a control signal between the base station and the mobile stations. The transceiver sequentially scans the speech channels and the control channel for monitoring status of calls and detecting a control signal transmitted from an originating mobile station. The control signal contains a sync field containing a sync code of a unique format, and an identification field containing the originating mobile station's identification code which follows the sync field and may undesirably contain a code identical to the unique format of the sync code.

According to a first aspect of this invention, the base station comprises a sync detector for detecting a code identical to the unique format of the sync code and deriving therefrom an output signal. First and second buffers are provided for storing a successive bit sequence of the control signal. A decoder is coupled to the first and second buffers for decoding contents of each of the buffers and detecting a match between the decoded contents of each buffer and a stored version of the mobile station's identification code. A buffer controller is responsive to an earlier one of two successive output signals from the sync detector for counting bits stored in the first buffer from the instant the earlier output signal is generated, and responsive to a later one of the successive output signals for counting bits stored in the second buffer from the instant the later output signal is generated. The buffer controller causes the bit sequence stored into the first buffer to be loaded into the decoder when the bit count thereof reaches a predetermined value and causes the bit sequence stored into the second buffer to be loaded into the decoder when the bit count thereof reaches the predetermined value. When a match is detected by the decoder, a control signal indicative of the match is transmitted through the control channel to the originating mobile station.

According to a second aspect of this invention, the base station comprises a sync detector for detecting a code identical to the unique format of the sync code and deriving therefrom an output signal. First and second buffers are provided for storing a successive bit sequence of the control signal. A decoder is coupled to the first and second buffers for decoding contents of each of the buffers and detecting a match between the decoded contents of each buffer and a stored version of the mobile station's identification code. A single buffer is provided for storing a successive bit sequence of the control signal. A buffer controller responds to each of two successive output signals from the sync detector if the output signals are spaced apart from each other a first interval or exclusively responsive to an earlier one of the two successive output signals if they are spaced apart from each other a second interval smaller than the first interval by counting bits stored into the single buffer and causing the stored bit sequence of the buffer means to be supplied to the decoder when the count value reaches a predetermined value.

BRIEF DESCRIPTION OF THE DRAWINGS

The present invention will be described in further detail with reference to the accompanying drawings, in which:

FIGS. 2A and 2B are timing diagrams associated with the embodiment of FIG. 1;

FIGS. 4A and 4B are timing diagrams associated with the embodiment of FIG. 3.

DETAILED DESCRIPTION

Figure 1:
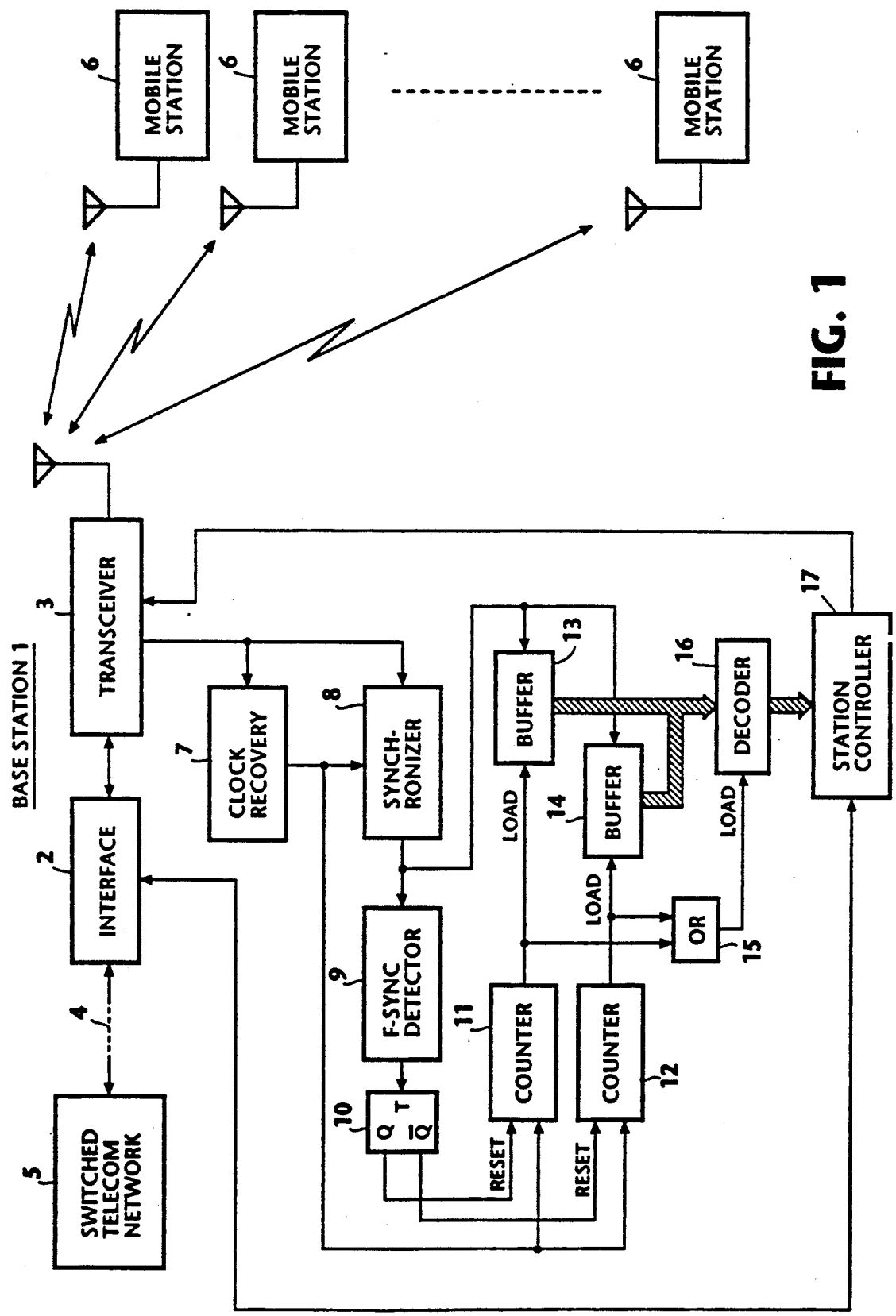
FIG. 1 is a block diagram of a mobile communications system according to an embodiment of the present invention.

Referring now to FIG. 1, there is shown a mobile communications system according to an embodiment of the present invention. The system comprises a base station 1 and a plurality of mobile stations 6 such as "cordless" telephones. Base station 1 includes a line interface 2 by which it is connected through an exchange line 4 to a switched telecommunication network 5, and a multichannel transceiver 3 through which the base station establishes speech channels with the mobile stations using a special channel, known as the control channel, according to a well known channel assignment algorithm. Transceiver 3 successively scans all channels under control of a base-station controller 17 to monitor the status of calls carried on the speech channels and to receive control signals from mobile stations 6 on the control channel. The control channel is provided by a subcarrier frequency on which the control signal is modulated according to MSK (minimum phase shift keying) format. When received from any mobile station, transceiver 3 converts the MSK subcarrier control signal to a nonreturn-to-zero (NRZ) format. Station controller 17 is connected to line interface 2 to detect calls from the switched network 5 and sends an off-hook signal thereto in response to a call request signal from the mobile stations.

When a call is originated from a mobile station, it sends a call request signal containing a 12-bit sequence of alternating 0 and 1 symbols as a preamble, a 16-bit sequence of frame sync code and a 37-bit sequence of calling information. The NRZ signal is then applied to a clock recovery circuit 7 which utilizes the 12-bit clock timing recovery preamble field of the incoming signal to establish the reference clock timing for the base station.

The output of clock recovery circuit 7 is coupled to a bit synchronizer 8 to allow it to clearly sample the incoming data stream at significant instants to recover a replica of the original pulse stream. The output of synchronizer 8 is applied to a frame sync detector 9 which checks each successive sequence of incoming bits with against a predetermined frame sequence and generates an output to trigger a T flip-flop 10 into one of its two binary states upon detection of a frame sequence which occurs in the 16-bit frame sync field of the call request signal. The frame sequence may also occur in the 37-bit calling sequence depending on the subscriber identification code. The output of synchronizer 8 is also applied to buffers 13 and 14 whose contents are loaded into a decoder 16 in response to a load command signal applied thereto.

The binary states at the Q and $\overline{Q}$ outputs of flip-flop 10 alternate in response to each occurrence of the output of frame sync detector 9 so that the Q output changes to the significant level when the sync detector first generates its output and the $\overline{Q}$ output changes to the significant level when a frame sync is subsequently detected again. The Q and $\overline{Q}$ outputs of flip-flop 10 are coupled respectively to the reset inputs of 37-bit counters 11 and 12 to which the output of clock recovery circuit 7 is also applied. Counters 11 and 12 each generate an output when it is clocked to a count equal to the number of bits contained in the calling sequence, i.e., 37 bits. The outputs of counters 11 and 12 are supplied as a load command signal to buffers 13 and 14, respectively, and by way of an OR gate 15 to decoder 16. In response to the respective load command inputs, the contents of each buffer are transferred to decoder 16 in which they are checked for error detection and correction and then the contents of a memory, not shown, are searched for one-to-one coincidence with a subscriber's identification code. If they match, decoder 16 communicates this fact to station controller 17 to allow it to communicate this fact to the calling station through transceiver 3. On receiving this signal, the calling station ceases transmission of the control signal.

The operation of the mobile communications system of this invention will be best understood by reference to FIGS. 2A and 2B in which it is assumed that the switching instant from a speech channel to the control channel occurs at time $T_0$. In FIG. 2A, the mobile station sends a control signal signaling the origination of a call, including a preamble, a frame sync and an encoded calling sequence identifying that station. The ID code of this mobile station is such that, when encoded with redundant bits according to a particular error detection and correction algorithm, it produces a false frame sync in the 37-bit calling sequence. If the channel switching instant $T_0$ occurs in the calling sequence of first occurrence as indicated, and if clock timing has been established shortly following time $T_0$, a false frame sync will be detected by frame sync detector 9, resulting in a frame-sync output signal of first occurrence at time $T_1$. At the same time, the same bit sequence as that supplied from synchronizer 8 to sync detector 9 is continuously stored into buffers 13 and 14.

The output of sync detector 9 triggers flip-flop 10 into a first binary condition in which it supplies a reset signal to counter 11. Counter 11 thus begins counting clock pulses from clock recovery circuit 7, and at the count of 37 bits it applies a load command signal to buffer 13 and via OR gate 15 to decoder 16 at time $T_2$. As the contents of buffer 13 are totally different from the calling sequence, decoder 16 produces an output indicating a mismatch. Base-station controller 17 ignores this mismatch signal and continues to monitor the output of decoder 16.

At time $T_3$, a true frame sync is detected by sync detector 9 and therefore a second frame-sync output is applied to flip-flop 10, switching it into a second binary condition in which it supplies a reset pulse to counter 12. Counter 12 begins counting clock pulses and at the count of 37 bits a load command signal is applied to buffer 14 and decoder 16 at time $T_4$. Thus, at time $T_4$, buffer 14 is filled with the calling sequence of second occurrence in the incoming data stream, and decoder 16 produces a signal indicating a match. Base-station controller 17 now recognizes that the calling station is one that is authorized for access to the base station and sends a signal through transceiver 3 to the originating station to cause it to cease the transmission of a subsequent control signal.

Assume that the channel switching instant $T_0$ occurs prior to a preamble as shown in FIG. 2B and the same mobile station as in the example of FIG. 2A has placed a call request. Frame sync detector 9 will produce a first output at time $T_1$ in response to a true frame sync in the incoming data stream, then a second output at time $T_2$ in response to a false frame sync embedded in a calling sequence of the data stream. Counters 11 and 12 are respectively triggered at times $T_1$ and $T_2$ to supply a first load command from counter 11 to buffer 13 and decoder 16 upon the count of 37 bits at time $T_3$. This results in the generation of a signal by decoder 16 indicating a match, and the calling mobile station is informed of this fact to cease transmission of a subsequent control signal. Thus, at the count of 37 bits by counter 12, a mismatch signal is generated at time $T_4$ which is ignored by base-station controller 17.

Figure 3:
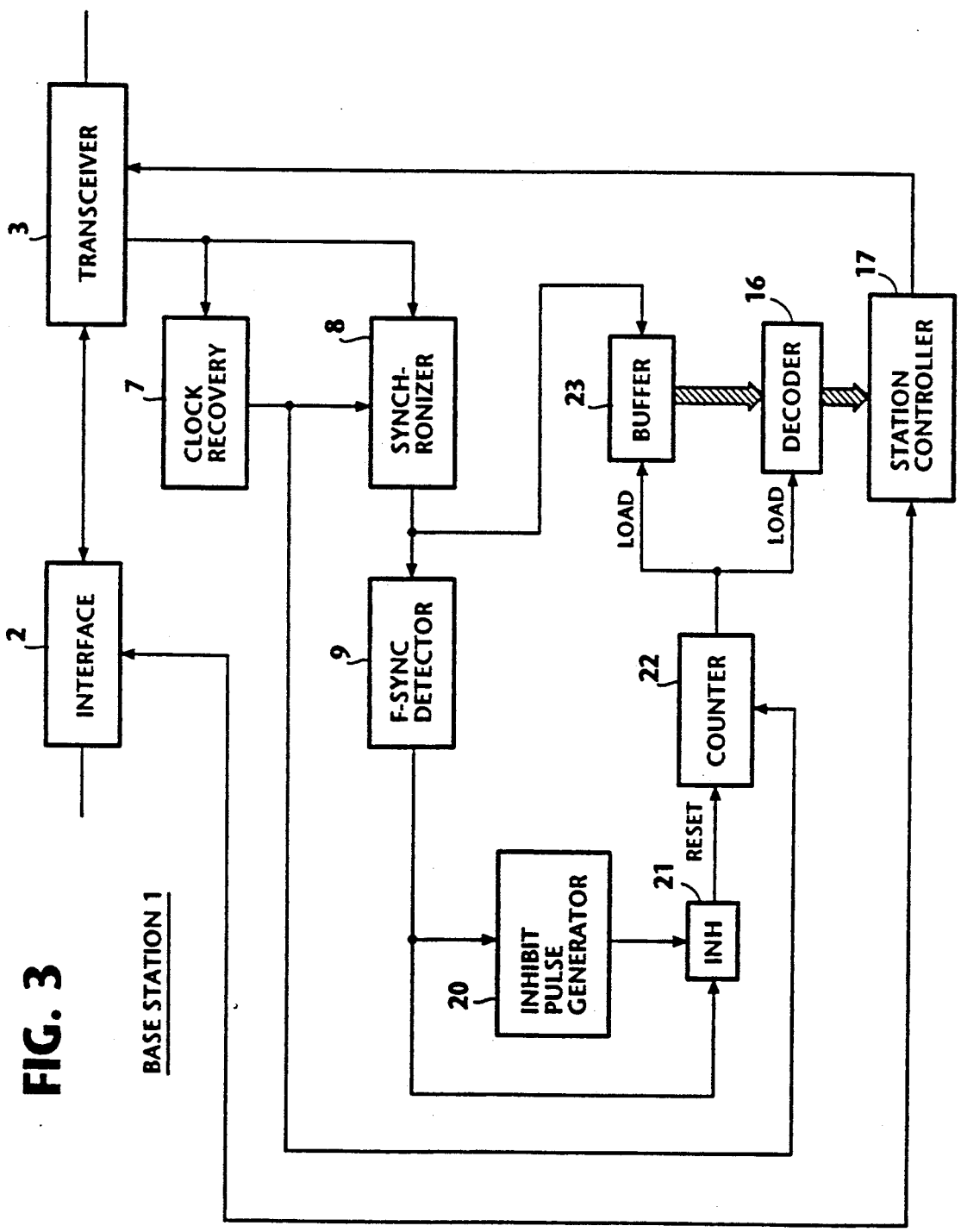
FIG. 3 is a block diagram of a mobile communications system according to a modified embodiment of this invention.

A modified embodiment of this invention is shown in FIG. 3. This embodiment is suitable for applications in which the true and false sync sequences are not equally spaced apart from each other. In this modification, a single buffer is used instead of the two-buffer scheme of FIG. 1 by inhibiting the output of frame sync detector 9 of second occurrence. As illustrated, the output of frame sync detector 9 is coupled to an inhibit pulse generator 20 which generates a pulse of duration sufficient to cover the instants at which the false frame sync is likely to occur following a true frame sync. The output of sync detector 9 is further applied to an inhibit gate 21 to which the inhibit pulse is applied to prevent the passage of a false sync detector output to the reset input of a 37-bit counter 22. A single buffer 23 constantly stores bit sequences from synchronizer 8 and responds to the output of counter 22 by loading its contents to decoder 16 at the count of 37 bits.

The operation of FIG. 3 will be understood by reference to FIGS. 4A and 4B. If the channel switching instant $T_0$ occurs in the calling sequence of a first control signal as shown in FIG. 4A, a sync detector output pulse a1 of first occurrence is generated in response to the false sync embedded in that calling sequence and is passed through the inhibit gate 21 to allow it to reset counter 22, causing it to start counting 37 bits of incoming data at time $T_1$. An inhibit pulse b1 is generated in response to the sync detector pulse a1, but it produces no effect on the buffer load timing, and a "mismatch" decision is taken by decoder 16 at time $T_2$. A sync detector output a2 is then generated at time $T_3$ in response to the true frame sync contained in the next control signal and is passed through inhibit gate 21 to counter 22, resetting it to start counting the next 37 bit sequence which exactly corresponds to the calling sequence of the second control signal. A sync detector output a3 of third occurrence is generated in response to the false sync embedded in the calling sequence. However, the sync output a3 is masked by an inhibit pulse b2 generated in response to the second sync output pulse a2. Therefore, a "match" decision is taken by decoder 16 at time $T_4$.

If the channel switching instant $T_0$ occurs prior to a preamble as shown in FIG. 4B, first and second sync detector outputs c1 and c2 are successively generated at times $T_1$ and $T_2$ in response to true and false frame sync patterns of the first control signal, as indicated. An inhibit pulse d1 is generated in response to sync detector pulse c1 to inhibit the next sync detector pulse c2, thus exclusively allowing the first pulse c1 to reset counter 22 to start counting 37 bits of incoming control data stream. Thus, a "match" decision is taken at time $T_3$. An inhibit pulse d2 will be generated in response to the second sync output c2, but it produces no effect.

If the calling sequence has been corrupted during transmission and a "mismatch" decision is taken at time $T_3$, the originating mobile station will send a second control signal as indicated by dotted lines and the above process is repeated, so that third and fourth sync detector outputs c3 and c4 are generated at times $T_4$ and $T_5$, in response to the true and false frame sync patterns of the second call control signal. An inhibit pulse d3 is generated in response to the third sync detector pulse c3 to mask the subsequent false sync output c4 to prevent it from disturbing the bit sequence stored in buffer 23.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A mobile communications system insensitive to false frame sync, including a base station and one or more mobile stations, said base station being connectable to a switched telecommunication network, said base station comprising:

transceiver means for establishing speech channels with said mobile stations for carrying information signals between said mobile stations and said switched telecommunication network and a control channel for carrying a control signal between said base station and said mobile stations, said transceiver means sequentially scanning said speech channels and said control channel for monitoring status of calls;

said transceiver means being operable for detecting a control signal transmitted from said mobile stations, said control signal containing a sync field containing a sync code of a unique format, and an identification field containing an encoded mobile station's identification code which follows said sync field and may undesirably contain a code identical to said unique sync code format;

sync detector means coupled to said transceiver means for detecting a code identical to said format sync code from the detected control signal and deriving therefrom an output signal;

first buffer means for storing a successive bit sequence of the detected control signal;

second buffer means for storing a successive bit sequence of the detected control signal;

decoder means coupled to said first and second buffer means for decoding the stored bit sequence of each of said buffer means and detecting a match between the decoded bit sequence of each of the buffer means and a stored version of the mobile station's identification code;

buffer control means responsive to an earlier one of two successive output signals from said sync detector means for counting bits stored into said first buffer means substantially from the instant said earlier output signal is generated, and responsive to a later one of said successive output signals for counting bits stored into said second buffer means substantially from the instant said later output signal is generated, and causing the stored bit sequence of said first buffer means to be supplied to said decoder means when the bit count value of said first buffer means reaches a predetermined value, and causing the stored bit sequence of said second buffer means to be supplied to said decoder means when the bit count of said second buffer means reaches said predetermined value; and means responsive to the detection of a match by said decoder means for sending a signal indicative of the match to said mobile stations through said transceiver means.

2. A mobile communications system as claimed in claim 1, wherein said sync detector means includes clock recovery means for recovering clock pulses from a clock recovery field which is further comprised in the detected control signal, and wherein said buffer control means comprises:

first and second counter means respectively responsive to first and second reset signals applied thereto for counting said clock pulses and thereby respectively incrementing first and second count values respectively representative of the bit counts of said first and second buffer means, said first and second counter means respectively causing said first and second buffer means to supply their stored bit sequences to said decoder means when said first and second count values reach said predetermined value; and means for alternatively supplying the output signal of said sync detector means to said first and second counter means as said first and second reset signals.

3. A mobile communications system insensitive to false frame sync, including a base station and one or more mobile stations, said base station being connectable to a switched telecommunication network, said base station comprising:

transceiver means for establishing speech channels with said mobile stations for carrying information signals between said mobile stations and said switched telecommunication network and a control channel for carrying a control signal between said base station and said mobile stations, said transceiver means sequentially scanning said speech channels and said control channel for monitoring status of calls;

said transceiver means being operable for detecting a control signal transmitted from said mobile stations as said control signal, said control signal containing a sync field containing a sync code of a unique format, and an identification field containing an encoded mobile station's identification code which follows said sync field and may undesirably contain a code identical to said unique sync code format;

sync detector means coupled to said transceiver means for detecting a code identical to said sync code format from the detected control signal and deriving therefrom an output signal;

buffer means for storing a successive bit sequence of the detected control signal;

decoder means coupled to said buffer means for decoding said stored bit sequence of said buffer means and detecting a match between the decoded bit sequence and a stored version of the mobile station's identification code;

buffer control means, responsive to each of two successive output signals from said sync detector means when said output signals are spaced apart from each other by a first interval, or exclusively responsive to an earlier one of said two successive output signals when said output signals are spaced apart from each other by a second interval smaller than said first interval, for counting bits stored into said buffer means, and causing the stored bit sequence of said buffer means to be supplied to said decoder means when the bit count of said buffer means reaches a predetermined value; and means responsive to the detection of a match by said decoder means for sending a signal indicative of the match to said mobile stations through said transceiver means.

4. A mobile communications system as claimed in claim 3, wherein said sync detector means comprises clock recovery means for recovering clock pulses from a clock recovery field which is further comprised in the control signal, and wherein said buffer control means comprises:

inhibit pulse generator means for generating an inhibit pulse in response to an output signal from said sync detector means;

counter means responsive to a reset signal applied thereto for counting said clock pulses and thereby incrementing a count value representative of said bit count of said buffer means substantially from the instant a reset signal is applied thereto; and inhibit gate means for supplying the output signal of said sync detector means as said reset signal in the absence of said inhibit pulse.

5. A communication method for a mobile communications system insensitive to false frame sync, including a base station connectable to a switched telecommunication network and mobile stations, wherein a speech channel is established between said base station and said mobile stations for carrying information signals between said mobile stations and said switched telecommunication network and a control channel is established for carrying said control signal from said mobile stations to said base station, said control signal containing a sync field containing a sync code of a unique format, and an identification field containing an encoded mobile station's identification code which follows said sync field and may undesirably contain a code identical to said unique format, and wherein said speech channels and said control channel are sequentially scanned to detect said control signal from the control channel, comprising the steps of:

a) detecting a code identical to said unique format from the detected control signal and deriving therefrom an output signal;

b) storing a successive bit sequence of the detected control signal in first and second buffers;

c) counting bits stored into said first buffer in response to an earlier one of two successive output signals detected by the step (a) and counting bits stored into said second buffer in response to a later one of said successive output signals detected by the step (a);

d) decoding a sequence of the bits stored into said first buffer when the bit count thereof reaches a predetermined value and decoding a sequence of bits stored into said second buffer when the bit count thereof reaches said predetermined value and detecting a match between each of the decoded bit sequences and a stored version of a mobile station's identification code; and e) transmitting a signal indicative of the match from said base station to the mobile station from which said control signal was transmitted to said base station.

6. A communication method for a mobile communications system insensitive to false frame sync, including a base station connectable to a switched telecommunication network and mobile stations, wherein a speech channel is established between said base station and said mobile stations for carrying information signals between said mobile stations and said switched telecommunication network and a control channel is established for carrying said control signal from said mobile stations to said base station, said control signal containing a sync field containing a sync code of a unique format, and an identification field containing an encoded mobile station's identification code which follows said sync field and may undesirably contain a code identical to said unique format, and wherein said speech channels and said control channel are sequentially scanned to detect said control signal from the control channel, comprising the steps of:

a) detecting a code identical to said unique format from the detected control signal and deriving therefrom an output signal;

b) storing a successive bit sequence of said control signal in a buffer;

c) counting bits stored into said buffer in response to either of two successive output signals detected by the step (a) when said output signals are spaced apart from each other by a first interval, or counting bits stored into said buffer in response to an earlier one of said successive output signals when said output signals are spaced apart from each other by a second interval smaller than the first interval;

d) decoding a sequence of bits stored into said buffer when the bit count thereof reaches a preselected value and detecting a match between the decoded bit sequence and a stored version of a mobile station's identification code; and e) transmitting a signal indicative of the match from said base station to the mobile station from which said control signal was received.

* * * * *